US012767841B2

(12) United States Patent
Ito et al.

(10) Patent No.: US 12,767,841 B2
(45) **Date of Patent: *Oct. 20, 2026**

(54) DISPERSANT-CONTAINING LIQUID AND DISPERSION

(71) Applicant: SEIKO EPSON CORPORATION, Tokyo (JP)

(72) Inventors: Hiroshi Ito, Matsumoto (JP); Koichi Terao, Suwa (JP); Nikako Tsukiji, Matsumoto (JP); Hajime Kakishita, Shiojiri (JP); Harunobu Komatsu, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 620 days.

This patent is subject to a terminal disclaimer.

(21) Appl. No.: 18/345,401

(22) Filed: Jun. 30, 2023

(65) Prior Publication Data

US 2024/0010862 A1 Jan. 11, 2024

(30) Foreign Application Priority Data

Jul. 5, 2022 (JP) ................................ 2022-108216

(51) Int. Cl.

| | |
|---|---|
| ***C09D 11/328*** | (2014.01) |
| ***C09D 7/20*** | (2018.01) |
| ***C09D 7/63*** | (2018.01) |
| ***C09D 167/03*** | (2006.01) |

(52) U.S. Cl.

CPC .............. *C09D 11/328* (2013.01); *C09D 7/20* (2018.01); *C09D 7/63* (2018.01); *C09D 167/03* (2013.01)

(58) Field of Classification Search

CPC .......... C09D 11/328; C09D 7/20; C09D 7/63; C09D 167/03; C09D 11/104; C09D 11/326; C09D 11/38; C09D 11/32; C08G 63/6886

See application file for complete search history.

(56) References Cited

U.S. PATENT DOCUMENTS

| | | | | |
|---|---|---|---|---|
| 5,510,417 | A | 4/1996 | Tachika et al. | |
| 5,913,972 | A * | 6/1999 | Kanou ................. | C09D 11/326 106/31.89 |
| 2004/0059020 | A1 | 3/2004 | Kamoto et al. | |
| 2008/0274317 | A1* | 11/2008 | Thompson ............. | C08G 63/85 524/80 |
| 2016/0246200 | A1 | 8/2016 | Toyoda et al. | |
| 2019/0233665 | A1* | 8/2019 | Chopra .................. | C09D 11/38 |
| 2022/0055378 | A1* | 2/2022 | Komada ................ | C09D 11/38 |
| 2022/0213341 | A1* | 7/2022 | Suzuki .................. | C09B 67/009 |
| 2024/0052068 | A1 | 2/2024 | Roller et al. | |

FOREIGN PATENT DOCUMENTS

| | | | | |
|---|---|---|---|---|
| CN | 1165163 | A | 11/1997 | |
| JP | H05-295239 | A | 11/1993 | |
| JP | H10-114865 | A | 5/1998 | |
| JP | 2005-036129 | A | 2/2005 | |
| JP | 2011225714 | A * | 11/2011 | |
| JP | 2016-176056 | A | 10/2016 | |
| JP | 2022-034320 | A | 3/2022 | |
| JP | 7651828 | B2 * | 3/2025 | ........... C09D 11/037 |
| WO | 2018-078078 | A1 | 5/2018 | |
| WO | 2022-112042 | A1 | 6/2022 | |

OTHER PUBLICATIONS

"Bisphenoxyethanolfluorene." ChemicalBook, www.chemicalbook.com/ChemicalProductProperty_EN_CB6747899.htm (Year: 2025).*
"Bisphenol A Bis(2-Hydroxyethyl)Ether." ChemBK, www.chembk.com/en/chem/Bisphenol%20A%20bis(2-hydroxyethyl)ether (Year: 2025).*
English machine translation of JP-2011225714-A (Year: 2011).*
English machine translation of JP-7651828-B2 (Year: 2025).*

* cited by examiner

*Primary Examiner* — Jennifer A Smith
*Assistant Examiner* — Jeffrey Eugene Barzach
(74) *Attorney, Agent, or Firm* — Harness, Dickey & Pierce, P.L.C.

(57) ABSTRACT

A dispersion of the present disclosure includes a polyester functioning as a dispersant, water, a dispersoid, and a solvent, the polyester has a carboxy group which forms no ester bond and a sulfo group, and the solvent includes a polyol having a log P of −2.0 to 0.0. In the polyester, a rate of a content of a monomer having the carboxy group to a content of a monomer having the sulfo group is preferably 50% to 200% on a molar basis.

8 Claims, No Drawings

DISPERSANT-CONTAINING LIQUID AND DISPERSION

The present application is based on, and claims priority from JP Application Serial Number 2022-108216, filed Jul. 5, 2022, the disclosure of which is hereby incorporated by reference herein in its entirety.

BACKGROUND

1. Technical Field

The present disclosure relates to a dispersant-containing liquid and a dispersion.

2. Related Art

A dispersion in which a dispersoid is dispersed in a dispersion medium including water has been used in various application fields.

As the dispersion as described above, for example, an ink in which a colorant is dispersed in a dispersion medium including water may be mentioned.

In the dispersion as described above, in order to improve a dispersibility of the dispersoid, a dispersant may be added in some cases.

For example, there has been known an ink jet-recording disperse dye ink containing water, a water-soluble organic solvent, a disperse dye, and a water-soluble polyester having an acid value of 100 to 250 (JP-A-10-114865).

However, heretofore, it has been difficult to simultaneously obtain a drying resistance of a dispersion and a dispersion stability of a dispersoid contained in the dispersion.

SUMMARY

The present disclosure was made to solve the problem described above and can be realized as the following application example.

A dispersant-containing liquid according to an application example of the present disclosure comprises a polyester functioning as a dispersant, water, and a solvent. In the dispersant-containing liquid described above, the polyester is a polyester having a carboxy group which forms no ester bond and a sulfo group, and the solvent includes a polyol having a log P of −2.0 to 0.0.

A dispersion according to another application example of the present disclosure comprises: a polyester functioning as a dispersant, water, a dispersoid, and a solvent, and the polyester is a polyester having a carboxy group which forms no ester bond and a sulfo group, and the solvent includes a polyol having a log P of −2.0 to 0.0.

DESCRIPTION OF EXEMPLARY EMBODIMENTS

Hereinafter, preferable embodiments of the present disclosure will be described in detail.

1. Dispersant-Containing Liquid

First, a dispersant-containing liquid of the present disclosure will be described.

The dispersant-containing liquid of the present disclosure contains a polyester functioning as a dispersant, water, and a solvent. The polyester is a polyester having a carboxy group which forms no ester bond and a sulfo group, and the solvent includes a polyol having a log P of −2.0 to 0.0.

According to the structure as described above, a water solubility of the polyester functioning as a dispersant can be made sufficiently excellent, and when a dispersion in which a dispersoid is dispersed using the dispersant-containing liquid is prepared, a dispersion stability of the dispersoid and a drying resistance of the dispersion both can be made excellent. In addition, as the index of the drying resistance, drying difficulty of the dispersion, re-dispersibility/re-dissolubility of a solid content precipitated by drying, and the like may be mentioned. In addition, when a dispersion is prepared using the dispersant-containing liquid, in the case in which a material to be used as a dispersoid is crushed and/or pulverized in the dispersant-containing liquid, the dispersoid, in particular, a colorant which will be described later, is likely to be crushed and/or pulverized when being wetted with the dispersant-containing liquid, and as a result, a time required for the preparation of the dispersion can be shortened. Furthermore, in the preparation of a dispersion, when an organic colorant is used as a dispersoid, since being not competitive with a moisturizing agent and a surface tension adjuster to be added in view of affinity and/or adsorption to the organic colorant and also having no adverse influence on a dispersion stability of the organic colorant, the dispersant-containing liquid described above is preferable.

On the other hand, when the conditions as described above are not satisfied, a satisfactory result cannot be obtained. For example, when the polyester functioning as a dispersant contained in the dispersant-containing liquid has only one of the carboxy group which forms no ester bond and the sulfo group, the water solubility of the polyester cannot be made sufficiently excellent, and when a dispersion in which a dispersoid is dispersed using the dispersant-containing liquid is prepared, the dispersion stability of the dispersoid cannot be made sufficiently excellent. In addition, the drying resistance of the dispersion is also degraded.

In addition, in the case in which the polyol having a log P of −2.0 to 0.0 is not contained in the dispersant-containing liquid, when a dispersion in which a dispersoid is dispersed using the dispersant-containing liquid is prepared, the dispersion stability of the dispersoid cannot be made sufficiently excellent. In addition, the drying resistance of the dispersion is also degraded.

In particular, instead of using the polyol having a log P of −2.0 to 0.0, when a polyol having a log P of less than −2.0 is used, or when a polyol having a log P of more than 0.0 is used, since a lipophilic property of the polyol may be excessively decreased or increased, respectively, and when a dispersion in which a dispersoid is dispersed using the dispersant-containing liquid is prepared, the dispersion stability of the dispersoid and the drying resistance of the dispersion are rapidly degraded.

In addition, the log P represents an octanol/water partition coefficient.

In addition, although the polyester has a carboxy group which forms no ester bond and a sulfo group, at least part of the carboxy group and the sulfo group may be in the form of salt, and in particular, a salt formed with a monovalent inorganic base is preferable.

1-1. Water

The dispersant-containing liquid of the present disclosure contains water. The water described above primarily has a function to impart the fluidity to the dispersant-containing liquid and a dispersion prepared using the dispersant-containing liquid and functions as a dispersion medium or a solvating medium.

As the water, ion exchange water, pure water, or ultrapure water is preferably used.

Although a lower limit of a content of the water in the dispersant-containing liquid is not particularly limited, the lower limit described above is preferably 30.0 percent by mass, more preferably 35.0 percent by mass, and further preferably 40.0 percent by mass. In addition, although an upper limit of the content of the water in the dispersant-containing liquid is not particularly limited, the upper limit described above is preferably 93.0 percent by mass, more preferably 90.0 percent by mass, and further preferably 87.0 percent by mass.

Accordingly, the viscosity of the dispersant-containing liquid can be more reliably adjusted to a preferable value. In addition, the dispersion stability of a dispersoid in a dispersion prepared using the dispersant-containing liquid can be made more excellent.

1-2. Polyester Functioning as Dispersant

Although being a generic name of a high molecular weight material having an ester bond in its main chain, the polyester generally has a chemical structure formed such that a polyol component having a plurality of hydroxy groups in its molecule and a polycarboxylic acid component having a plurality of carboxy groups in its molecule are dehydration condensed.

In particular, the dispersant-containing liquid of the present disclosure contains as a dispersant, a polyester having a carboxy group which forms no ester bond and a sulfo group.

Although the carboxy group which forms no ester bond and the sulfo group may be present at any positions of the polyester molecule and may be present on the same monomer forming the polyester, the carboxy group which forms no ester bond and the sulfo group are preferably present on different monomers forming the polyester. In other words, the polyester preferably has, as constituent monomers, a first monomer having a carboxy group which forms no ester bond and a second monomer having a sulfo group.

Accordingly, the dispersion stability of a dispersoid in a dispersion prepared using the dispersant-containing liquid can be made further excellent.

As the first monomer having a carboxy group which forms no ester bond, for example, there may be mentioned an at least trivalent carboxylic acid compound, a lower alkyl diester or an anhydride thereof, a carboxy group-containing polyol, or a salt of at least one of those mentioned above, and those mentioned above may be used alone, or at least two types thereof may be used in combination. As the at least trivalent carboxylic acid compound mentioned above, for example, there may be mentioned tricarballylic acid, β-alanine diacetic acid, trimellitic acid, trimesic acid, pyromellitic acid, or mellophanic acid. As the carboxy group-containing polyol described above, for example, there may be mentioned N,N-bis(2-hydroxyethyl)-β-alanine or N,N-bis(2-hydroxyethyl)succinamic acid. In addition, as the first monomer, when a resin terminal modifier which will be described later is used, as the resin terminal modifier, for example, a divalent polycarboxylic acid monomer which will be described later may be used.

As the second monomer having a sulfo group, for example, there may be mentioned a sulfonated polycarboxylic acid monomer, a lower alkyl ester or an anhydride thereof, or a sulfonated polyol monomer, and those mentioned above may be used alone, or at least two types thereof may be used in combination. As the sulfonated polycarboxylic acid monomer described above, for example, there may be mentioned sulfoisophthalic acid, sulfoterephthalic acid, sulfophthalic acid, sulfosuccinic acid, sulfomalonic acid, 2,3-disulfosuccinic acid, sulfotartaric acid, sulfomalic acid, sulfomaleic acid, sulfofumaric acid, 1-sulfo-1,2-cyclohexanedicarboxylic acid, or 3-(sodiooxysulfonyl)glutaric acid. As the sulfonated polyol monomer described above, for example, there may be mentioned 2,3-dihydroxy-1-propanesulfonic acid, 3-[bis(2-hydroxyethyl)amino]-1-propanesulfonic acid, or 2-hydroxy-3-[bis(2-hydroxyethyl)amino]-1-propanesulfonic acid.

A lower limit of a total rate of a content of the first monomer and a content of the second monomer with respect to all monomers forming the polyester described above on a molar basis is preferably 2.0%, more preferably 4.0%, and further preferably 6.0%. In addition, an upper limit of the total rate of the content of the first monomer and the content of the second monomer with respect to all the monomers forming the polyester on a molar basis is preferably 20.0%, more preferably 18.0%, and further preferably 16.0%.

By the structure as described above, the water solubility of the polyester functioning as a dispersant can be made more excellent, and when a dispersion in which a dispersoid is dispersed using the dispersant-containing liquid is prepared, the dispersion stability of the dispersoid and the drying resistance of the dispersion can be made more excellent. In addition, when the dispersion is an ink jet composition, while an ejection stability of the ink jet composition by an ink jet method can be made more excellent, a color development property of a recorded portion formed using the ink jet composition can be made more excellent. In addition, a water resistance of the recorded portion formed using the ink jet composition can also be made more excellent.

A lower limit of a rate of the content of the monomer having a carboxy group to the content of the monomer having a sulfo group in the polyester on a molar basis is preferably 50%, more preferably 55%, and further preferably 60%. In addition, an upper limit of the rate of the content of the monomer having a carboxy group to the content of the monomer having a sulfo group in the polyester on a molar basis is preferably 200%, more preferably 150%, and further preferably 120%.

Accordingly, the water solubility of the polyester functioning as a dispersant can be made more excellent, and when a dispersion in which a dispersoid is dispersed using the dispersant-containing liquid is prepared, the dispersion stability of the dispersoid and the drying resistance of the dispersion can be made more excellent.

The carboxy group which forms no ester bond and the sulfo group may be present, for example, on a side chain of the polyester molecule and/or at a terminal of the main chain thereof.

When the carboxy group which forms no ester bond is present on a side chain of the polyester molecule, the carboxy group can be preferably introduced, for example, in such a manner that in synthesis of the polyester, an at least trivalent polycarboxylic acid or one of a lower alkyl ester and an anhydride thereof is used as a polycarboxylic acid monomer, or a compound having at least two hydroxy groups and at least one carboxy group is used as a polyol monomer.

In addition, when the carboxy group which forms no ester bond is present at a terminal of the main chain of the polyester, the carboxy group described above can be preferably introduced, for example, as described in the following concrete example in such a manner that as described in the concrete example which will be described later, after a polymer is synthesized by adjusting reaction conditions so that a hydroxy group is present at the terminal, the hydroxy group at the terminal of the polymer and a carboxy group of an at least divalent polycarboxylic acid monomer functioning as a resin terminal modifier are allowed to react with each other. In addition, in the case described above, as the resin terminal modifier, a lower alkyl ester or an anhydride of the at least divalent polycarboxylic acid monomer described above may also be used.

When the sulfo group is present on a side chain of the polyester molecule, the sulfo group described above can be preferably introduced, for example, in such a manner that in synthesis of the polyester, an at least divalent polycarboxylic acid having a sulfo group or one of a lower alkyl ester and an anhydride thereof is used as a polycarboxylic acid monomer, or a compound having, besides a sulfo group, at least two hydroxy groups is used as a polyol monomer.

In addition, when the sulfo group is present at a terminal of the main chain of the polyester, the sulfo group described above can be preferably introduced, for example, as described in the following concrete example in such a manner that as described in the concrete example which will be described later, after a polymer is synthesized by adjusting reaction conditions so that a hydroxy group is present at the terminal, the hydroxy group at the terminal of the polymer and a carboxy group of a resin terminal modifier having both a carboxy group and a sulfo group are allowed to react with each other.

As the polycarboxylic acid monomer, for example, there may be mentioned an aromatic polycarboxylic acid, such as phthalic acid, terephthalic acid, isophthalic acid, 2,5-norbornanedicarboxylic acid, 1,4-naphthalenedicarboxylic acid, biphenyldicarboxylic acid, 4,4'-sulfonyldibenzoic acid, or 2,5-naphthalenedicarboxylic acid; an aliphatic polycarboxylic acid, such as oxalic acid, malonic acid, glutaric acid, adipic acid, pimelic acid, azelaic acid, sebacic acid, fumaric acid, maleic acid, itaconic acid, 1,3-cyclopentanedicarboxylic acid, 1,2-cyclohexanedicarboxylic acid, 1,3-cyclohexanedicarboxylic acid, or 1,4-cyclohexanedicarboxylic acid; or a lower alkyl ester or an anhydride of at least one of those mentioned above, and those mentioned above may be used alone, or at least two types thereof may be used in combination.

As the polyol monomer, for example, there may be mentioned an aliphatic polyol, such as ethylene glycol, diethylene glycol, triethylene glycol, a polyethylene glycol, propylene glycol, dipropylene glycol, tripropylene glycol, a polypropylene glycol, 1,3-propanediol, neopentyl glycol, 1,3-butanediol, 1,4-butanediol, 1,5-pentanediol, 1,6-hexanediol, 2,2,4-trimethyl-1,6-hexanediol, 1,2-cyclohexanedimethanol, 1,3-cyclohexanedimethanol, 1,4-cyclohexanedimethanol, or 2,2'-bis(4-hydroxycyclohexyl)isopropane; or an aromatic polyol, such as 1,4-benzenedimethanol, 1,3-benzenedimethanol, 1,2-benzenedimethanol, biphenol, 4,4'-methylene bisphenol, 2,2-di(p-hydroxyphenyl)propane, styrene glycol, 2-phenyl-1,3-propanediol, or naphthalenediol, and those mentioned above may be used alone, or at least two types thereof may be used in combination.

The polyester described above preferably includes a water-insoluble aromatic monomer having no water-soluble group but having an aromatic ring.

Accordingly, when a dispersion is prepared using the dispersant-containing liquid of the present disclosure and a highly lipophilic material, such as an oil dye or a disperse dye, a dispersoid formed from the material described above can be more preferably adsorbed to the polyester described above, and the dispersion stability of the dispersoid in the dispersion can be made more excellent.

As the water-soluble group, for example, a sulfo group, a carboxy group, or a phosphoric acid group may be mentioned.

In addition, as the aromatic ring of the water-insoluble aromatic monomer, for example, there may be mentioned a phenyl group, a biphenyl group, a naphthyl group, or a functional group in which at least one hydrogen atom of one of the functional groups mentioned above is replaced with another atom or another atomic group, and those mentioned above may be used alone, or at least two types thereof may be used in combination.

A lower limit of a content of the water-insoluble aromatic monomer with respect to all the monomers forming the polyester described above is preferably 25 percent by mole, more preferably 30 percent by mole, and further preferably 33 percent by mole. In addition, an upper limit of the content of the water-insoluble aromatic monomer with respect to the all the monomers forming the polyester described above is preferably 75 percent by mole, more preferably 70 percent by mole, and further preferably 65 percent by mole.

Accordingly, when a dispersion is prepared using the dispersant-containing liquid of the present disclosure and a highly lipophilic material, such as an oil dye or a disperse dye, since a hydrophobic adsorption force of the polyester to a dispersoid formed from the material described above can be sufficiently increased, and in addition, since a flexibility of the polyester molecule can be made more excellent, the polyester molecule is able to preferably follow a surface shape of the dispersoid. As a result, the polyester described above can be more preferably adsorbed to the dispersoid, and the dispersion stability of the dispersoid in the dispersion can be made further excellent.

A lower limit of the number average molecular weight of the polyester is preferably 1,500, more preferably 1,800, and further preferably 2,000. An upper limit of the number average molecular weight of the polyester is preferably 10,000, more preferably 8,000, and further preferably 7,000.

By the structure as described above, the water solubility of the polyester functioning as a dispersant can be made more excellent, and when a dispersion in which a dispersoid is dispersed using the dispersant-containing liquid is prepared, the dispersion stability of the dispersoid and the drying resistance of the dispersion can be made more excellent. In addition, the viscosity of the dispersant-containing liquid and the viscosity of a dispersion prepared using the dispersant-containing liquid each can be adjusted in a more preferable range, and for example, when the dispersion is an ink jet composition, while the ejection stability of the ink jet composition by an ink jet method can be made more excellent, the color development property of a recorded portion formed using the ink jet composition can be made more excellent.

A lower limit of a content of the polyester in the dispersant-containing liquid is preferably 3.0 percent by mass, more preferably 4.0 percent by mass, and further preferably 4.5 percent by mass. In addition, an upper limit of the content of the polyester in the dispersant-containing liquid is preferably 35.0 percent by mass, more preferably 30.0 percent by mass, and further preferably 28.0 percent by mass.

Accordingly, the viscosity of the dispersant-containing liquid and the viscosity of a dispersion prepared using the dispersant-containing liquid are each likely to be adjusted in a preferable range, and handling of the dispersant-containing liquid and that of the dispersion each can be made more excellent. In addition, when a dispersion in which a dispersoid is dispersed using the dispersant-containing liquid is prepared, the dispersion stability of the dispersoid and the drying resistance of the dispersion can also be made more excellent.

1-3. Solvent

The dispersant-containing liquid of the present disclosure contains, besides the water, a solvent which is a liquid component other than water. The solvent described above primarily has a function to impart the fluidity to the dispersant-containing liquid and a dispersion prepared using the dispersant-containing liquid and functions as a dispersion medium or a solvating medium.

The solvent includes a polyol having a log P of −2.0 to 0.0. A lower limit of the log P of the polyol may be −2.0 and is preferably −1.9, more preferably −1.8, and further preferably −1.7. In addition, an upper limit of the log P of the polyol may be 0.0 and is preferably −0.1, more preferably −0.2, and further preferably −0.3.

Accordingly, the effect described above can be more significantly obtained.

As the polyol, for example, there may be mentioned 1,2-pentanediol (log P: 0.0), 1,6-hexanediol (log P: −0.1), neopentyl glycol (log P: −0.34), trimethylolpropane (log P: −0.9), 1,2-propanediol (log P: −1.1), trimethylolethane (log P: −1.3), ethylene glycol (log P: −1.36), or triethylene glycol (log P: −2.0), and those mentioned above may be used alone, or at least two types thereof may be used in combination.

Although a content of the polyol in the dispersant-containing liquid is not particularly limited, a lower limit of the content of the polyol with respect to 100.0 parts by mass of the polyester is preferably 1.0 part by mass, more preferably 1.2 parts by mass, and further preferably 1.5 parts by mass. In addition, an upper limit of the content of the polyol with respect to 100.0 parts by mass of the polyester is preferably 50.0 parts by mass, more preferably 30.0 parts by mass, and further preferably 20.0 parts by mass.

Accordingly, the viscosity of the dispersant-containing liquid and the viscosity of a dispersion prepared using the dispersant-containing liquid can be adjusted in a more preferable range, and for example, when the dispersion described above is an ink jet composition, while the ejection stability of the ink jet composition by an ink jet method can be made more excellent, the color development property of a recorded portion formed using the ink jet composition can be made more excellent.

The solvent forming the dispersant-containing liquid of the present disclosure may a solvent including the polyol described above and may further include another solvent component. For example, the solvent forming the dispersant-containing liquid of the present disclosure may also include, besides the polyol described above, a polyol component having a log P not in a range of −2.0 to 0.0, a component other than a polyol, and/or the like as the another solvent component.

However, a content of the polyol with respect to the total solvent forming the dispersant-containing liquid of the present disclosure is preferably 50.0 percent by mass or more, more preferably 70.0 percent by mass or more, and further preferably 90.0 percent by mass or more.

1-4. Basic Material

The dispersant-containing liquid of the present disclosure may further contain, besides the components described above, a basic material as a pH adjuster.

Accordingly, the pH of the dispersant-containing liquid can be adjusted in a preferable range, a more preferable dissolved state of the polyester can be secured in the dispersant-containing liquid, and for example, problems, such as aggregation and precipitation, caused by insolubilization of the polyester can be more effectively prevented. As a result, for example, when a dispersion in which a dispersoid is dispersed using the dispersant-containing liquid is prepared, the dispersion stability of the dispersoid and the drying resistance of the dispersion can be made more excellent. In addition, when the dispersion is an ink jet composition, the ejection stability of the ink jet composition by an ink jet method can be made more excellent.

As the basic material, for example, there may be mentioned a monovalent inorganic base, a divalent inorganic base, or a water-soluble organic amine, and those mentioned above may be used alone, or at least two types thereof may be used in combination.

As the monovalent inorganic base, for example, although an alkali metal hydroxide, such as lithium hydroxide, sodium hydroxide, or potassium hydroxide, or ammonia may be mentioned, in particular, an alkali metal hydroxide is preferable, and sodium hydroxide is more preferable.

As the divalent inorganic base, for example, an alkaline earth metal hydroxide may be mentioned.

As the water-soluble organic amine, for example, an organic amine having a solubility of 10 g or more in 100 g of water at 20° C. may be used. As a concrete example of the water-soluble organic amine, for example, there may be mentioned an alkylamine, such as monoethylamine, diethylamine, triethylamine, monomethylamine, dimethylamine, or trimethylamine; diethanolamine, triethanolamine, diisopropanolamine, triisopropanolamine, butyldiethanolamine, ethyldiethanolamine, or 2-amino-2-ethyl-1,3-propanediol.

In particular, as the water-soluble organic amine, hydroxylamine is preferable, a diolamine or a triolamine is more preferable, and triethanolamine is further preferable.

Accordingly, while a water solubility of the water-soluble organic amine is increased to a particularly high level, since the boiling point can be increased, and a high hygroscopic property can also be obtained, the precipitation of solid contents caused by unfavorable drying of the dispersant-containing liquid and a dispersion prepared using the dispersant-containing liquid can be more effectively prevented.

In addition, as the basic material, the dispersant-containing liquid preferably contains a monovalent inorganic base and a water-soluble organic amine.

Accordingly, when a salt is formed with the anionic polyester described above, by a strong water solubility of the salt of the monovalent inorganic base and an affinity of the water-soluble organic amine salt to the additive used for preparation of a dispersion, the polyester described above can be stably dissolved in the dispersion, and a long-term stability of the dispersion can be made more excellent.

In addition, the basic material may be used, for example, so as to form a salt with the monomer when the polyester is synthesized or may be mixed with the synthesized polyester.

1-5. Other Components

The dispersant-containing liquid of the present disclosure may further contain components other than the components described above. Hereinafter, the "components" as described above are called "other components".

As the other components, for example, there may be mentioned a dispersant and/or a resin component other than the polyester described above; a moisturizing agent, a surface tension adjuster, an antiseptic agent, and/or a chelating agent, and those mentioned above may be used alone, or at least two types thereof may be used in combination.

However, the dispersant-containing liquid of the present disclosure is a liquid containing no dispersoid. A liquid containing, besides the constituent components of the dispersant-containing liquid of the present disclosure, a dispersoid is a dispersion of the present disclosure which will be described later.

In addition, a content of the other components in the dispersant-containing liquid of the present disclosure is preferably 10.0 percent by mass or less, more preferably 5.0 percent by mass or less, and further preferably 3.0 percent by mass or less.

1-6. Others

The dispersant-containing liquid of the present disclosure preferably satisfies the following conditions.

For example, a lower limit of the pH of the dispersant-containing liquid of the present disclosure at 20° C. is preferably 7.0, more preferably 7.2, and further preferably 7.4. In addition, an upper limit of the pH of the dispersant-containing liquid of the present disclosure at 20° C. is preferably 10.0, more preferably 9.0, and further preferably 8.6.

Accordingly, a more preferable dissolved state of the polyester can be secured, and for example, the problems, such as aggregation and precipitation, caused by the insolubilization of the polyester can be more effectively prevented. As a result, for example, when a dispersion in which a dispersoid is dispersed using the dispersant-containing liquid is prepared, the dispersion stability of the dispersoid and the drying resistance of the dispersion can be made more excellent. In addition, when the dispersion described above is an ink jet composition, the ejection stability of the ink jet composition by an ink jet method can be made more excellent.

The dispersant-containing liquid of the present disclosure can be more preferably prepared, for example, in such a manner that after the essential components, such as the solvent including a polyol and the water described above, are added to the polyester obtained by a condensation reaction, stirring is performed. In addition, while the stirring is performed, if needed, heating may also be performed.

2. Dispersion

Next, a dispersion of the present disclosure will be described.

The dispersion of the present disclosure contains a polyester functioning as a dispersant, water, a dispersoid, and a solvent. The polyester described above is a polyester having a carboxy group which forms no ester bond and a sulfo group, and the solvent described above includes a polyol having a log P of −2.0 to 0.0.

By the structure as described above, a water solubility of the polyester functioning as a dispersant can be made sufficiently excellent, and the dispersion stability of the dispersoid in the dispersion and the drying resistance of the dispersion can both be made excellent.

2-1. Water

The dispersion of the present disclosure contains water. The water primarily has a function to impart the fluidity to the dispersion and functions as a dispersion medium or a solvating medium.

As the water, ion exchange water, pure water, or ultrapure water is preferably used.

Although a lower limit of a content of the water in the dispersion is not particularly limited, the lower limit described above is preferably 35.0 percent by mass, more preferably 40.0 percent by mass, and further preferably 45.0 percent by mass. In addition, although an upper limit of the content of the water in the dispersion is not particularly limited, the upper limit described above is preferably 93.0 percent by mass, more preferably 90.0 percent by mass, and further preferably 87.0 percent by mass.

Accordingly, the viscosity of the dispersion can be more reliably adjusted at a preferable value. In addition, the dispersion stability of the dispersoid in the dispersion can be made more excellent.

2-2. Polyester Functioning as Dispersant

The dispersion of the present disclosure contains as a dispersant, a polyester having a carboxy group which forms no ester bond and a sulfo group.

The polyester as described above preferably satisfies conditions similar to those described in the above "1-2.".

Accordingly, an effect similar to that described above can be obtained.

A lower limit of a content of the polyester in the dispersion is preferably 0.3 percent by mass, more preferably 0.4 percent by mass, and further preferably 0.5 percent by mass. In addition, an upper limit of the content of the polyester in the dispersion is preferably 17.5 percent by mass, more preferably 15.0 percent by mass, and further preferably 14.0 percent by mass.

Accordingly, the viscosity of the dispersion is likely to be adjusted in a preferable range, handling of the dispersion can be made more excellent, and in addition, the dispersion stability of the dispersoid and the drying resistance of the dispersion can be made more excellent.

In addition, a lower limit of a content of the polyester with respect to 100.0 parts by mass of the dispersoid contained in the dispersion is preferably 10.0 parts by mass, more preferably 15.0 parts by mass, and further preferably 20.0 parts by mass. In addition, an upper limit of the content of the polyester with respect to 100.0 parts by mass of the dispersoid contained in the dispersion is preferably 200.0 parts by mass, more preferably 150.0 parts by mass, and further preferably 90.0 parts by mass.

Accordingly, the viscosity of the dispersion is likely to be adjusted in a preferable range, handling of the dispersion can be made more excellent, and in addition, the dispersion stability of the dispersoid and the drying resistance of the dispersion can be made more excellent.

2-3. Solvent

The dispersion of the present disclosure contains, besides the water, a solvent which is a liquid component other than water. The solvent described above primarily has a function to impart the fluidity to the dispersion and functions as a dispersion medium or a solvating medium.

The solvent includes a polyol having a log P of −2.0 to 0.0. The polyol as described above preferably satisfies conditions similar to those described in the above "1-3.".

Accordingly, an effect similar to that described above can be obtained.

Although a content of the polyol in the dispersion is not particularly limited, a lower limit of the content of the polyol with respect to 100.0 parts by mass of the polyester is preferably 1.0 part by mass, more preferably 1.2 parts by mass, and further preferably 1.5 parts by mass. In addition, an upper limit of the content of the polyol with respect to 100.0 parts by mass of the polyester is preferably 50.0 parts by mass, more preferably 30.0 parts by mass, and further preferably 20.0 parts by mass.

Accordingly, the viscosity of the dispersion can be adjusted in a more preferable range, and for example, when the dispersion is an ink jet composition, while the ejection stability of the ink jet composition by an ink jet method can be made more excellent, the color development property of a recorded portion formed using the ink jet composition can be made more excellent.

The solvent forming the dispersion of the present disclosure may be a solvent including the polyol described above and may also further include another solvent component.

However, a content of the polyol with respect to a total solvent forming the dispersion of the present disclosure is preferably 50.0 percent by mass or more, more preferably 70.0 percent by mass or more, and further preferably 90.0 percent by mass or more.

2-4. Dispersoid

The dispersion of the present disclosure contains a dispersoid.

The dispersoid may be contained in a dispersed state in the dispersion, and dispersoids formed from various types of materials may be used in consideration of, for example, the application of the dispersion. As a constituent material of the dispersoid, for example, there may be mentioned water-poorly soluble resin materials and colorants such as various pigments or various dyes including a disperse dye, a sublimation dye, and an oil-soluble dye.

As the pigment, for example, there may be mentioned a quinacridone-based pigment, a quinacridone quinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, an azo-based pigment, or a carbon black.

In more particular, as a yellow pigment, for example, there may be mentioned C.I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, or 180. As a magenta pigment, for example, there may be mentioned C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48(Ca), 48(Mn), 48:2, 48:3, 48:4, 49, 49:1, 50, 51, 52, 52:2, 53, 53:1, 55, 57(Ca), 57:1, 60, 60:1, 63:1, 63:2, 64, 64:1, 81, 83, 87, 88, 89, 90, 101, 104, 105, 106, 108, 112, 114, 122, 123, 146, 149, 163, 166, 168, 170, 172, 177, 178, 179, 184, 185, 190, 193, 202, 209, or 219. As a cyan pigment, for example, there may be mentioned C.I. Pigment Blue 1, 2, 3, 15, 15:1, 15:2, 15:3, 15:34, 16, 17:1, 22, 25, 56, or 60; or C.I. Vat Blue 4, 60, or 63. As other color pigments, for example, there may be mentioned C.I. Pigment Orange 5, 13, 16, 17, 36, 43, or 51; C.I. Pigment Green 1, 4, 7, 8, 10, 17, 18, or 36; or C.I. Pigment Violet 1, 3, 5:1, 16, 19, 23, or 38.

As the disperse dye, for example, there may be mentioned C.I. Disperse Red 60, 82, 86, 86:1, 167:1, 279, or 364; C.I. Disperse Yellow 54, 64, 71, 86, 114, 153, 232, 233, or 245; C.I. Disperse Blue 27, 60, 73, 77, 77:1, 87, 257, 359, or 367; C.I. Disperse Violet 26, 33, 36, or 57; or C.I. Disperse Orange 30, 41, or 61.

As the oil-soluble dye, for example, there may be mentioned C.I. Solvent Yellow 16, 21, 25, 29, 33, 51, 56, 82, 88, 89, 150, or 163; C.I. Solvent Red 7, 8, 18, 24, 27, 49, 109, 122, 125, 127, 130, 132, 135, 218, 225, or 230; C.I. Solvent Blue 14, 25, 35, 38, 48, 67, 68, 70, or 132; or C.I. Solvent Black 3, 5, 7, 27, 28, 29, or 34.

The dispersoid contained in the dispersion of the present disclosure is preferably either a disperse dye or an oil-soluble dye.

Accordingly, the dispersion stability of the dispersoid in the dispersion can be made more excellent. In addition, the dispersion of the present disclosure can be preferably applied, for example, to an ink composition, in particular, to an ink jet composition, and for example, the color development property of a recorded portion formed using the above composition can be made more excellent.

Although a content of the dispersoid in the dispersion of the present disclosure is not particularly limited, a lower limit of the content of the dispersoid in the dispersion of the present disclosure is preferably 1.0 percent by mass, more preferably 2.0 percent by mass, and further preferably 3.0 percent by mass. In addition, an upper limit of the content of the dispersoid in the dispersion of the present disclosure is preferably 40.0 percent by mass, more preferably 35.0 percent by mass, and further preferably 30.0 percent by mass.

Accordingly, while the content of the dispersoid in the dispersion is increased to a sufficiently high level, the dispersion stability of the dispersoid can be made more excellent. In addition, for example, when the dispersoid is dispersed using a dispersing machine such as a bead mill, the viscosity of a dispersion to be obtained is likely to be adjusted in a preferable range. In addition, when the dispersion is an ink composition, such as an ink jet composition, the color development property of a recorded portion formed using the ink composition described above can be made more excellent.

2-5. Basic Material

The dispersion of the present disclosure may further contain, besides the components described above, a basic material functioning as a pH adjuster.

Accordingly, since the pH of the dispersion can be adjusted in a preferable range, in the dispersion, a more preferable dissolved state of the polyester can be secured, and for example, problems, such as aggregation and precipitation, caused by insolubilization of the polyester can be more effectively prevented. As a result, for example, the dispersion stability of the dispersoid in the dispersion and the drying resistance of the dispersion can be made more excellent. In addition, when the dispersion is an ink jet composition, the ejection stability of the ink jet composition by an ink jet method can be made more excellent.

The basic material as described above preferably satisfies conditions similar to those described in the above "1-4.".

Accordingly, an effect similar to that described above can be obtained.

2-6. Moisturizing Agent

The dispersion of the present disclosure may contain a moisturizing agent.

As the moisturizing agent, for example, there may be mentioned a polyol, such as diethylene glycol, triethylene glycol, tetraethylene glycol, pentaethylene glycol, trimethylene glycol, 2-butene-1,4-diol, 2-ethyl-1,3-hexanediol, 2-methyl-2,4-pentanediol, tripropylene glycol, isobutylene glycol, glycerin, diglycerin, meso-erythritol, trimethylolpropane, ditrimethylolpropane, pentaerythritol, or dipentaerythritol; a saccharide including a monosaccharide, a disaccharide, an oligosaccharide, and a polysaccharide, such as 2-glucose, mannose, fructose, ribose, xylose, arabinose, galactose, aldonic acid, glucitol (sorbit), maltose, cellobiose, lactose, sucrose, trehalose, or maltotriose, or a derivative of at least one of those mentioned above; or a betaine such as glycine or trimethylglycine. Those mentioned above may be used alone, or at least two types thereof may be used in combination.

Although a content of the moisturizing agent in the dispersion of the present disclosure is not particularly limited, a lower limit of the content of the moisturizing agent in the dispersion of the present disclosure is preferably 3.0 percent by mass, more preferably 5.0 percent by mass, and further preferably 7.0 percent by mass. In addition, an upper limit of the content of the moisturizing agent in the dispersion of the present disclosure is preferably 40.0 percent by mass, more preferably 35.0 percent by mass, and further preferably 30.0 percent by mass.

2-7. Surface Tension Adjuster

The dispersion of the present disclosure may contain a surface tension adjuster.

As the surface tension adjuster, for example, a surfactant or a water-soluble compound having a log P of more than 0.0 to 4.0 may be mentioned.

As the surfactant, for example, although a cationic surfactant, an anionic surfactant, or a nonionic surfactant may be mentioned, in order to reduce an influence on the solubility of the polyester which is dissolved in an anionic state, in particular, a nonionic surfactant is preferable.

As a nonionic non-reactive surfactant, for example, a silicone-based surfactant, a fluorine-based surfactant, or an acetylene glycol-based surfactant may be mentioned.

As the silicone-based surfactant, for example, there may be mentioned BYK-306, BYK-307, BYK-333, BYK-341, BYK-345, BYK-346, BYK-348, BYK-349, or BYK-3455 (manufactured by BYK Japan KK); Silface SAG503A, SAG002, SAG005, or SAG014 (manufactured by Nisshin Chemical Industry Co., Ltd.); or KF-351A, KF-352A, KF-353, KF-354L, KF-355A, KF-615A, KF-945, KF-640, KF-642, KF-643, KF-6020, X-22-4515, KF-6011, or KF-6012 (manufactured by Shin-Etsu Chemical Co., Ltd.).

As the fluorine-based surfactant, for example, there may be mentioned FC-4430 or FC-4432 (manufactured by 3M Japan Limited); Megafac F-444, F-477, F-553, or F-556 (manufactured by DIC Corporation); or Surflon S-241, S-242, S-243, or S-386 (manufactured by AGC Seimi Chemical Co., Ltd.).

As the acetylene glycol-based surfactant, for example, there may be mentioned Surfynol 82, 465, 485, or 2502, Olfine E1010, E1020, PD-002W, PD-004, EXP4001, EXP4002, EXP4123, or EXP4300 (manufactured by Nisshin Chemical Industry Co., Ltd.); or Acetylenol E00, E103T, E40, E60, E100, or E200 (manufactured by Kawaken Fine Chemicals Co., Ltd.).

As the water-soluble compound having a log P of more than 0.0 to 4.0, for example, there may be mentioned a lower alcohol, such as 2-propanol (log P: 0.05). 1-propanol (log P: 0.25), 2-butanol (log P: 0.6), or 1-butanol (log P: 0.88); a glycol monoether. such as diethylene glycol monobutyl ether (log P: 0.4), triethylene glycol monobutyl ether (log P: 0.5), propylene glycol monobutyl ether (log P: 1.2), dipropylene glycol monobutyl ether (log P: 1.5), ethylene glycol mono-2-ethylhexyl ether (log P: 2.8), or diethylene glycol mono-2-ethylhexyl ether (log P: 2.4); a lower alkyl 1.2-diol, such as 1.2-pentanediol (log P: 0.06) or 1.2-hexanediol (log P: 0.6); or a glycerin monoether, such as glycerin monobutyl ether (log P: 0.6) or glycerin-2-ethylhexyl ether (log P: 2.5).

Although a content of the surface tension adjuster in the dispersion of the present disclosure is not particularly limited, a lower limit of the content of the surface tension adjuster in the dispersion of the present disclosure is preferably 0.1 percent by mass, more preferably 0.3 percent by mass, and further preferably 1.0 percent by mass. In addition, an upper limit of the content of the surface tension adjuster in the dispersion of the present disclosure is preferably 10.0 percent by mass, more preferably 8.0 percent by mass, and further preferably 6.0 percent by mass.

2-8. Other Components

The dispersion of the present disclosure may further contain components other than the components described above. Hereinafter, the components as described above are called "other components" in this item.

As the other components, for example, there may be mentioned an antiseptic agent, a chelating agent, a dispersant, and/or a resin component, the latter two being other than the polyester described above, and those mentioned above may be used alone, or at least two types thereof may be used in combination.

Since containing an antiseptic agent, for example, the dispersion is prevented from being decomposed by microorganisms, and the precipitation and the aggregation of the solid content in the dispersion can be effectively prevented.

As the antiseptic agent, for example, there may be mentioned methylisothiazolinone, chloromethylisothiazolinone, octylisothiazolinone, dichlorooctylisothiazolinone, benzisothiazolinone, dicyclohexylamine, iodopropynyl butylcarbamate, or diethylene oximide.

Since the chelating agent is contained, for example, a polyvalent cation in the dispersion is trapped, and the precipitation and the aggregation of the solid content in the dispersion can be effectively prevented.

As the chelating agent, for example, there may be mentioned an ethylenediaminetetraacetic acid salt, a diethyltriaminepentaacetic acid salt, a pentetic acid salt, an iminodisuccinic acid salt, or an aspartic acid diacetate salt.

However, a content of the other components in the dispersion of the present disclosure is preferably 10.0 percent by mass or less, more preferably 5.0 percent by mass or less, and further preferably 3.0 percent by mass or less.

2-9. Others

The dispersion of the present disclosure preferably satisfies the following conditions.

For example, a lower limit of the pH of the dispersion of the present disclosure at 20° C. is preferably 7.0, more preferably 7.2, and further preferably 7.4. In addition, an upper limit of the pH of the dispersion of the present disclosure at 20° C. is preferably 10.0, more preferably 9.0, and further preferably 8.6.

Accordingly, a more preferable dissolved state of the polyester described above can be secured, and for example, the problems, such as aggregation and precipitation, caused by the insolubilization of the polyester can be more effectively prevented. As a result, for example, the dispersion stability of the dispersoid in the dispersion and the drying resistance of the dispersion can be made more excellent. In addition, when the dispersion is an ink jet composition, the ejection stability of the ink jet composition by an ink jet method can be made more excellent.

The dispersion of the present disclosure may be used for any application, such as paints and various types of ink compositions, but is most preferably used as an ink jet composition.

In an ink jet composition, for example, when a dispersoid in this composition is precipitated or aggregated, or when a solid content thereof is precipitated in an ink jet head or a flow path, the ejection stability by an ink jet method is seriously adversely influenced, and in some cases, the ejection of the composition by an ink jet method cannot be carried out. In other words, in the ink jet composition, the dispersion stability of the dispersoid and the drying resistance of the dispersion are both required to be obtained at a higher level. In order to respond to this requirement, according to the present disclosure, the dispersion stability of the dispersoid and the drying resistance of the dispersion can be preferably simultaneously obtained. That is, when the dispersion is an ink jet composition, the effect of the present disclosure can be more significantly obtained. In addition, in this specification, the ink jet composition is a concept including, besides an ink jet ink itself to be ejected by an ink jet method, for example, an undiluted solution thereof to be mixed with other components for preparation of the ink jet ink.

Although a lower limit of the viscosity of the dispersion of the present disclosure at 20° C. is not particularly limited, the lower limit described above is preferably 2.0 mPa-s and more preferably 3.0 mPa-s. In addition, although an upper limit of the viscosity of the dispersion of the present disclosure at 20° C. is not particularly limited, the upper limit described above is preferably 9.0 mPa-s, more preferably 8.0 mPa-s, and further more preferably 7.0 mPa-s.

Accordingly, for example, when the dispersion of the present disclosure is an ink jet composition, the ejection stability thereof can be made more excellent.

In addition, the viscosity can be measured at 20° C., for example, using a viscoelastic tester, such as an MCR-300, manufactured by Pysica, in such a manner that a shear rate is increased from 10 [$s^{-1}$] to 1,000 [$s^{-1}$], and a viscosity at a shear rate of 200 [$s^{-1}$] is read.

Although a lower limit of the surface tension of the dispersion of the present disclosure at 20° C. is not particularly limited, the lower limit described above is preferably 20 mN/m, more preferably 21 mN/m, and further preferably 23 mN/m. In addition, although an upper limit of the surface tension of the dispersion of the present disclosure at 20° C. is not particularly limited, the upper limit described above is preferably 50 mN/m, more preferably 40 mN/m, and further preferably 30 mN/m.

Accordingly, for example, when the dispersion of the present disclosure is an ink jet composition, nozzle clogging or the like of a recording apparatus using an ink jet method is more unlikely to occur, and the ejection stability of the dispersion of the present disclosure is further improved. In addition, even if the nozzle clogging occurs, when the nozzle is capped, that is, when capping is performed, a recovery property can be made more excellent.

In addition, as the surface tension, a value measured by Wilhelmy method may be used. For the measurement of the surface tension, for example, a surface tensiometer, such as a CBVP-7 (manufactured by Kyowa Interface Science Co., Ltd.), may be used.

When the dispersion of the present disclosure is an ink jet ink, the ink described above is generally received in a container, such as a cartridge, a bag, or a tank, and is then applied to a recording apparatus using an ink jet method. In other words, a recording apparatus according to the present disclosure is an apparatus including a container, such as an ink cartridge, to receive an ink jet ink which is the dispersion of the present disclosure.

The dispersion of the present disclosure can be prepared, for example, in such a manner that the dispersant-containing liquid of the present disclosure described above and a material to be used as the dispersoid are mixed together.

In the case described above, while the dispersant-containing liquid of the present disclosure and the material to be used as the dispersoid are placed in a mixed state, for example, a bead mill may be used. Accordingly, the material to be used as the dispersoid can be efficiently and finely pulverized, and hence, the dispersion stability of the dispersoid in the dispersion of the present disclosure can be made more excellent.

As the beads, for example, various types of inorganic beads, such as zirconia beads, stainless steel beads, or alumina beads, may be preferably used.

When the dispersion of the present disclosure is prepared, besides the dispersant-containing liquid of the present disclosure described above and the material to be used as the dispersoid, for example, components, such as water, a solvent, a moisturizing agent, and/or a surface tension adjuster, may also be used.

When the dispersion of the present disclosure is prepared, if needed, heating may also be performed.

In addition, the dispersion of the present disclosure is not limited to that prepared by the method as described above. For example, the dispersion of the present disclosure may also be prepared in such a manner that without using the dispersant-containing liquid of the present disclosure described above, necessary components, such as the polyester obtained by a condensation reaction, the material to be used as the dispersoid, the solvent including a polyol, and water, are collectively mixed together or are sequentially added in a predetermined order and then mixed together.

Heretofore, although preferable embodiments of the present disclosure are described, the present disclosure is not limited thereto.

EXAMPLES

Next, concrete examples of the present disclosure will be described.

3. Synthesis of Polyester

Synthetic Example 1

After 223.0 parts by mass of terephthalic acid functioning as a polycarboxylic acid monomer, 37.0 parts by mass of 5-sulfoisophthalic acid sodium salt functioning as a polycarboxylic acid type water-soluble monomer, 758.0 parts by mass of ethylene glycol functioning as a polyol, and 5.0 parts by mass of tetrabutoxytitanate functioning as a catalyst were charged in an autoclave, an ester condensation reaction was performed by heating at 150° C. to 200° C. for 180 minutes.

Next, the diol component was distilled off at a temperature of 200° C. by gradually decreasing the pressure in the system to 10 mmHg over 30 minutes, and at the pressure described above, a polymerization reaction was continued for 90 minutes. After 61.0 parts by mass of maleic anhydride functioning as a resin terminal modifier was added to a reaction product obtained as described above, a reaction was further performed at 200° C. for 60 minuets so as to introduce a carboxy group to a polyester terminal, so that a polyester functioning as a dispersant was obtained.

A number average molecular weight of the polyester thus obtained was 3,000, a molar rate of the carboxy group to the sulfo group was 60%, and a molar rate of a monomer having an aromatic ring to all monomers of the polyester was 37%.

In addition, the number average molecular weight of the polyester thus obtained was measured by a GPC. In addition, the molar rate in the polyester was measured by a 1H-NMR. The sulfo group amount was calculated by measuring a sulfur amount using an XRF. The carboxy group amount was calculated from the acid value of the polyester. In addition, the number average molecular weight, the molar rate in the polyester, the sulfo group amount, and the carboxy group amount of each of polyesters synthesized in the following synthetic examples were also obtained in a manner similar to that described above.

Synthetic Examples 2 to 5

Except for that the types of raw monomers used in the synthesis of the polyester and the usages thereof were changed as shown in Table 1, a polyester was obtained in a manner similar to that of the above Synthetic Example 1.

Synthetic Example 6

After 90.0 parts by mass of terephthalic acid and 90.0 parts by mass of isophthalic acid each functioning as a polycarboxylic acid monomer, 37.0 parts by mass of 5-sulfoisophthalic acid sodium salt and 52.0 parts by mass of trimellitic anhydride each functioning as a polycarboxylic acid type water-soluble monomer, 403.0 parts by mass of ethylene glycol and 240.0 parts by mass of neopentyl glycol each functioning as a polyol, and 5.0 parts by mass of tetrabutoxytitanate functioning as a catalyst were charged in an autoclave, an ester condensation reaction was performed by heating at 150° C. for 180 minutes. The diol component was distilled off by gradually decreasing the pressure in the system to 10 mmHg over 30 minutes, and at the pressure described above, a polymerization reaction was continued for 90 minutes, so that a polyester functioning as a dispersant was obtained.

A number average molecular weight of the polyester thus obtained was 10,000, a molar rate of the carboxy group to the sulfo group was 100%, and a molar rate of a monomer having an aromatic ring to all monomers of the polyester was 30%.

Synthetic Example 7

Except for that the types of raw monomers used in the synthesis of the polyester and the usages thereof were changed as shown in Table 1, a polyester was obtained in a manner similar to that of the above Synthetic Example 6.

The conditions of the polyesters obtained in the above Synthetic Examples 1 to 7 are collectively shown in Table 1. In addition, in Table 1, the numerical value of "COMPONENT USED FOR SYNTHESIS" in Table 1 indicates the usage of each component based on part(s) by mass.

| | | | | | SYNTHETIC EXAMPLE | | | | | | |
|---|---|---|---|---|---|---|---|---|---|---|---|
| | | | | | 1 | 2 | 3 | 4 | 5 | 6 | 7 |
| COMPONENT USED FOR SYNTHESIS | POLYCARBOXYLIC ACID MONOMER | HYDROPHOBIC MONOMER | AROMATIC MONOMER | TEREPHTHALIC ACID | 223.0 | 90.0 | 120.0 | 90.0 | 145.0 | 90.0 | 241.0 |
| | | | | ISOPHTHALIC ACID | 0.0 | 60.0 | 90.0 | 120.0 | 139.0 | 90.0 | 0.0 |
| | | | ALIPHATIC MONOMER | ADIPIC ANHYDRIDE | 0.0 | 156.0 | 0.0 | 39.0 | 0.0 | 0.0 | 0.0 |
| | | WATER-SOLUBLE MONOMER | SULFONIC ACID TYPE | 5-SULFOISOPHTHALIC ACID SODIUM SALT | 37.0 | 0.0 | 37.0 | 19.0 | 0.0 | 37.0 | 37.0 |
| | | | CARBOXYLIC ACID TYPE | TRIMELLITIC ANHYDRIDE | 0.0 | 0.0 | 0.0 | 0.0 | 0.0 | 52.0 | 0.0 |
| | POLYOL MONOMER | HYDROPHOBIC MONOMER | AROMATIC MONOMER | BENZENEDIMETHANOL | 0.0 | 0.0 | 0.0 | 290.0 | 0.0 | 0.0 | 0.0 |
| | | | | 2,2-DI(P-HYDROXYPHENYL)PROPANE | 0.0 | 0.0 | 0.0 | 0.0 | 31.0 | 0.0 | 0.0 |
| | | | ALIPHATIC MONOMER | ETHYLENE GLYCOL | 758.0 | 0.0 | 323.0 | 81.0 | 452.0 | 403.0 | 806.0 |
| | | | | NEOPENTYL GLYCOL | 0.0 | 337.0 | 240.0 | 0.0 | 0.0 | 240.0 | 0.0 |
| | | WATER-SOLUBLE MONOMER | SULFONIC ACID TYPE | SODIUM DIHYDROXY PROPANE SULFONATE | 0.0 | 0.0 | 0.0 | 0.0 | 67.0 | 0.0 | 0.0 |
| | | | CARBOXYLIC ACID TYPE | BIS(2-HYDROXYETHYL)-β-ALANINE | 0.0 | 56.0 | 0.0 | 0.0 | 0.0 | 0.0 | 0.0 |
| | RESIN TERMINAL MODIFIER | WATER-SOLUBLE MONOMER | SULFONIC ACID TYPE | SODIUM 4-SULFOPHTHALIC ANHYDRIDE | 0.0 | 40.0 | 0.0 | 0.0 | 0.0 | 0.0 | 0.0 |
| | | | CARBOXYLIC ACID TYPE | MALEIC ANHYDRIDE | 61.0 | 0.0 | 102.0 | 0.0 | 0.0 | 0.0 | 0.0 |
| | | | | TRIMELLITIC ANHYDRIDE | 0.0 | 0.0 | 0.0 | 52.0 | 31.0 | 0.0 | 0.0 |
| NUMBER AVERAGE MOLECULAR WEIGHT | | | | | 3000 | 5000 | 2000 | 2000 | 6000 | 10000 | 2500 |
| RATE OF CARBOXY GROUP/SULFO GROUP OF POLYESTER (MOLAR RATE) | | | | | 60% | 100% | 400% | 200% | 50% | 100% | 0% |
| RATE OF AROMATIC MONOMER/ALL MONOMERS (MOLAR RATE) | | | | | 37% | 25% | 35% | 75% | 54% | 30% | 40% |

4. Preparation of Dispersant-Containing Liquid

Example A1

After 80.0 parts by mass of pure water, 1.10 parts by mass of triethanolamine functioning as a basic material, and 1.0 part by mass of neopentyl glycol functioning as a polyol solvent were added in a flask, stirring was performed in an environment at 20° C., so that a homogeneous solution was obtained. After 15.0 parts by mass of the polyester synthesized in Synthetic Example 1 was added to this homogeneous solution, and stirring was then performed at 70° C. for 60 minutes, pure water was further added so that the total mass was 100.0 parts by mass, and as a result, a dispersant-containing liquid was obtained.

Examples A2 to A6

Except for that the types of components used in the preparation of the dispersant-containing liquid and the usages thereof were changed as shown in Table 2, a dispersant-containing liquid was prepared in a manner similar to that of the above Example A1.

Comparative Examples A1 to A3

Except for that the types of components used in the preparation of the dispersant-containing liquid and the usages thereof were changed as shown in Table 2, a dispersant-containing liquid was prepared in a manner similar to that of the above Example A1.

The conditions of the dispersant-containing liquids according to the above Examples and Comparative Examples are collectively shown in Table 2. In addition, the numerical value of "USAGE" of "COMPONENT USED FOR PREPARATION" in Table 2 indicates the usage of each component based on part(s) by mass. In addition, the turbidity of each dispersant-containing liquid was obtained based on JIS K0101, and in the column "DISSOLVED STATE" in Table 2, the result obtained in accordance with the following criteria is shown. As the turbidity is lower, the solubility of the polyester is regarded as superior.

A: Turbidity is less than 50 FTU.

B: Turbidity is 50 to less than 200 FTU.

C: Turbidity is 200 FTU or more.

5. Preparation of Undiluted Solution of Ink Jet Ink as Dispersion

Example B1

After 50.0 parts by mass of the dispersant-containing liquid prepared in the above Example A1 and 35.0 parts by mass of pure water were mixed together, 15.0 parts by mass of a disperse dye (C.I. Disperse Blue 359) functioning as a colorant was added to form a mixture, and the mixture thus obtained was dispersed for 2 hours by a bead mill using zirconia balls having a diameter of 0.5 mm as media. Subsequently, the beads were separated, and filtration was performed using a filter having a pore diameter of 8 μm, so that an undiluted solution of an ink jet ink as the dispersion was obtained.

Examples B2 to B6

Except for that the type of dispersant-containing liquid and the type of colorant, each of which was used for the preparation of the undiluted solution of the ink jet ink, were changed as shown in Table 3, an undiluted solution of an ink jet ink as the dispersion was prepared in a manner similar to that of the above Example B1.

Comparative Examples B1 to B3

Except for that the type of dispersant-containing liquid and the type of colorant, each of which was used for the preparation of the undiluted solution of the ink jet ink, were changed as shown in Table 3, an undiluted solution of an ink jet ink as the dispersion was prepared in a manner similar to that of the above Example B1.

| | | | | EXAMPLE | | | | | | COMPARATIVE EXAMPLE | | |
|---|---|---|---|---|---|---|---|---|---|---|---|---|
| | | | | A1 | A2 | A3 | A4 | A5 | A6 | A1 | A2 | A3 |
| COMPONENT USED FOR PREPARATION | POLYESTER | | TYPE | SYNTHETIC EXAMPLE 1 | SYNTHETIC EXAMPLE 2 | SYNTHETIC EXAMPLE 3 | SYNTHETIC EXAMPLE 4 | SYNTHETIC EXAMPLE 5 | SYNTHETIC EXAMPLE 6 | SYNTHETIC EXAMPLE 7 | SYNTHETIC EXAMPLE 6 | SYNTHETIC EXAMPLE 6 |
| | | | USAGE | 15.00 | 15.00 | 15.00 | 15.00 | 15.00 | 15.00 | 15.00 | 15.00 | 15.00 |
| | BASIC MATERIAL | TRIETHANOLAMINE | USAGE | 1.10 | 1.80 | 1.80 | 3.60 | 2.10 | 1.80 | 0.00 | 1.80 | 1.80 |
| | SOLVENT | TRIETHYLENE GLYCOL (logP −2.0) | USAGE | 0.00 | 0.00 | 0.00 | 7.50 | 0.00 | 0.00 | 0.00 | 0.00 | 0.00 |
| | | NEOPENTYL GLYCOL (logP −0.34) | USAGE | 1.00 | 0.00 | 1.00 | 0.00 | 2.00 | 1.00 | 1.00 | 0.00 | 0.00 |
| | | 1,6-HEXANEDIOL (logP −0.1) | USAGE | 0.00 | 0.15 | 0.00 | 0.00 | 0.00 | 0.00 | 0.00 | 0.00 | 0.00 |
| | | 1,2-OCTANEDIOL (logP 2.1) | USAGE | 0.00 | 0.00 | 0.00 | 0.00 | 0.00 | 0.00 | 0.00 | 1.00 | 0.00 |
| | | ERYTHRITOL (logP −2.3) | USAGE | 0.00 | 0.00 | 0.00 | 0.00 | 0.00 | 0.00 | 0.00 | 0.00 | 1.00 |
| | WATER | PURE WATER | USAGE | 82.90 | 83.05 | 82.20 | 73.90 | 80.90 | 82.20 | 84.00 | 82.20 | 82.20 |
| PH OF DISPERSANT-CONTAINING LIQUID AT 20° C. | | | | 8.0 | 7.6 | 8.2 | 8.0 | 8.0 | 8.2 | 8.2 | 8.2 | 8.2 |
| DISSOLVED STATE | | | | A | A | A | A | A | A | C | A | A |

The conditions of the undiluted solutions of the ink jet inks according to the above Examples and Comparative Examples are collectively shown in Table 3. In addition, the numerical value of "USAGE" of "COMPONENT USED FOR PREPARATION" in Table 3 indicates the usage of each component based on part(s) by mass. In addition, the pHs of the undiluted solutions of the ink jet inks according to the above Examples at 20° C. are all in a range of 7.0 to 10.0.

used for the preparation of the undiluted solution of the ink jet ink, and the usages thereof were changed as shown in Table 4, an ink jet ink as the dispersion was prepared in a manner similar to that of the above Example C1.

Comparative Examples C1 to C3

Except for that the type of undiluted solution of the ink jet ink, the type of each additive component, each of which was

| | | | | EXAMPLE | | | | | | COMPARATIVE EXAMPLE | | |
|---|---|---|---|---|---|---|---|---|---|---|---|---|
| | | | | B1 | B2 | B3 | B4 | B5 | B6 | B1 | B2 | B3 |
| COMPONENT USED FOR PREPARATION | DISPERSANT-CONTAINING LIQUID | | TYPE | EXAMPLE A1 | EXAMPLE A2 | EXAMPLE A3 | EXAMPLE A4 | EXAMPLE A5 | EXAMPLE A6 | COMPARATIVE EXAMPLE A1 | COMPARATIVE EXAMPLE A2 | COMPARATIVE EXAMPLE A3 |
| | | | USAGE | 50.0 | 50.0 | 50.0 | 50.0 | 50.0 | 50.0 | 50.0 | 50.0 | 50.0 |
| | COLORANT | C.I. DISPERSE BLUE 359 | USAGE | 15.0 | 15.0 | 15.0 | 0.0 | 0.0 | 15.0 | 15.0 | 15.0 | 15.0 |
| | | C.I. SOLVENT BLUE 70 | USAGE | 0.0 | 0.0 | 0.0 | 15.0 | 15.0 | 0.0 | 0.0 | 0.0 | 0.0 |
| | WATER | PURE WATER | USAGE | 35.0 | 35.0 | 35.0 | 35.0 | 35.0 | 35.0 | 35.0 | 35.0 | 35.0 |

6. Preparation of Ink Jet Ink as Dispersion

Example C1

After 33.0 parts by mass of the undiluted solution of the ink jet ink prepared in the above Example B1; 15.0 parts by mass of glycerin and 10.0 parts by mass of triethylene glycol each functioning as a moisturizing agent; 0.2 parts by mass of BYK-348 (manufactured by BYK Japan KK), 0.3 parts by mass of Surfynol 465 (manufactured by Nisshin Chemical Industry Co. Ltd.), and 4.0 parts by mass of triethylene glycol monobutyl ether each functioning as a surface tension adjuster; and 0.2 parts by mass of triethanolamine as a basic material were mixed together, water was further added so that the total mass was 100.0 parts by mass. Subsequently, a mixture thus obtained was stirred in an environment at 20° C. for 30 minutes and was then filtrated using a microfiltration filter having a pore diameter of 3 μm, so that an ink jet ink as the dispersion was obtained.

Examples C2 to C6

Except for that the type of undiluted solution of the ink jet ink, the type of each additive component, each of which was used for the preparation of the undiluted solution of the ink jet ink, and the usages thereof were changed as shown in Table 4, an ink jet ink as the dispersion was prepared in a manner similar to that of the above Example C1.

The conditions of the ink jet inks according to the above Examples and Comparative Examples are collectively shown in Table 4. In addition, the numerical value of "USAGE" of "COMPONENT USED FOR PREPARATION" in Table 4 indicates the usage of each component based on part(s) by mass. The pHs of the ink jet inks according to the above Examples at 20° C. are all in a range of 7.0 to 10.0. In addition, the viscosity of the ink jet ink according to each of the above Examples is 2.0 to 9.0 mPa-s. In addition, the viscosity was measured using a viscoelastic tester MCR-300 (manufactured by Pysica) at 20° C. in such a manner that a shear rate was increased from 10 [$s^{-1}$] to 1,000 [$s^{-1}$], and a viscosity at a shear rate of 200 [$s^{-1}$] was read. In addition, the surface tensions of the ink jet inks according to the above Examples are all in a range of 23 to 30 mN/m. In addition, the surface tension was measured at 20° C. by Wilhelmy method using a surface tensiometer (CBVP-7, manufactured by Kyowa Interface Science Co., Ltd.).

| | | | | EXAMPLE | | | | | | COMPARATIVE EXAMPLE | | |
|---|---|---|---|---|---|---|---|---|---|---|---|---|
| | | | | C1 | C2 | C3 | C4 | C5 | C6 | C1 | C2 | C3 |
| COMPONENT USED FOR PREPARATION | UNDILUTED SOLUTION OF INK JET | | TYPE | EXAMPLE B1 | EXAMPLE B2 | EXAMPLE B3 | EXAMPLE 34 | EXAMPLE B5 | EXAMPLE B6 | COMPARATIVE EXAMPLE B1 | COMPARATIVE EXAMPLE B2 | COMPARATIVE EXAMPLE B3 |
| | INK | | USAGE | 33.0 | 33.0 | 33.0 | 33.0 | 33.0 | 33.0 | 33.0 | 33.0 | 33.0 |
| | MOISTURIZING AGENT | GLYCERIN | USAGE | 15.0 | 15.0 | 10.0 | 10.0 | 15.0 | 10.0 | 10.0 | 10.0 | 10.0 |
| | | TRIETHYLENE GLYCOL | USAGE | 10.0 | 10.0 | 15.0 | 15.0 | 10.0 | 15.0 | 15.0 | 15.0 | 15.0 |
| | SURFACE TENSION ADJUSTER | BYK-348 | USAGE | 0.2 | 0.2 | 0.4 | 0.4 | 0.2 | 0.4 | 0.4 | 0.4 | 0.4 |
| | | SURFYNOL 465 | USAGE | 0.3 | 0.3 | 0.0 | 0.0 | 0.3 | 0.0 | 0.0 | 0.0 | 0.0 |
| | | TRIETHYLENE GLYCOL | USAGE | 4.0 | 4.0 | 0.0 | 0.0 | 4.0 | 0.0 | 0.0 | 0.0 | 0.0 |

-continued

| | | | EXAMPLE | | | | | | COMPARATIVE EXAMPLE | | |
|---|---|---|---|---|---|---|---|---|---|---|---|
| | | | C1 | C2 | C3 | C4 | C5 | C6 | C1 | C2 | C3 |
| | MONOBUTYL ETHER | | | | | | | | | | |
| | 1,2-HEXANEDIOL | USAGE | 0.0 | 0.0 | 2.0 | 2.0 | 0.0 | 2.0 | 2.0 | 2.0 | 2.0 |
| BASIC MATERIAL | TRIETHANOLAMINE | USAGE | 0.2 | 0.2 | 0.2 | 0.2 | 0.2 | 0.2 | 0.2 | 0.2 | 0.2 |
| WATER | PURE WATER | USAGE | 37.3 | 37.3 | 39.4 | 39.4 | 37.3 | 39.4 | 39.4 | 39.4 | 39.4 |

7. Evaluation

7-1. Evaluation of Drying Resistance

The ink jet inks of the above Examples C1 to C6 and Comparative Examples C1 to C3 were each dripped in an amount of 0.05 mL on a glass plate and then left at 40° C. for one day for drying. After the ink was dried, the glass plate was immersed in a corresponding ink jet ink for 10 minutes and was then recovered therefrom, and the trace of the dried ink droplet was observed by visual inspection and then evaluated in accordance with the following criteria.

A: Trace of ink droplet completely disappears.

B: More than 0% to less than 5% in area rate of trace of ink droplet remains.

C: 5% to less than 25% in area rate of trace of ink droplet remains.

D: 25% or more in area rate of trace of ink droplet remains.

7-2. Evaluation of Storage Stability Measured by Stability of Viscosity

After the ink jet inks of the above Examples C1 to C6 and Comparative Examples C1 to C3 were each received in a sample container and then left at 70° C. for one week, the viscosity thereof at 20° C. was measured and then evaluated in accordance with the following criteria by comparison with the viscosity of an ink jet ink at 20° C. immediately after manufacturing. As the rate of change in viscosity is lower, the dispersion stability of the dispersoid is regarded as superior.

A: Rate of change in viscosity from that immediately after manufacturing is less than 10%.

B: Rate of change in viscosity from that immediately after manufacturing is 10% to less than 20%.

C: Rate of change in viscosity from that immediately after manufacturing is 20% or more.

D: Viscosity cannot be measured since aggregation and/or gelation occurs.

7-3. Evaluation of Storage Stability Measured by Stability of Particle Diameter After the ink jet inks of the above Examples C1 to C6 and Comparative Examples C1 to C3 were each received in a sample container and then left at 70° C. for one week, the average particle diameter of the dispersoid contained in the ink jet ink in an environment at 20° C. was measured and then evaluated in accordance with the following criteria by comparison with the average particle diameter of the dispersoid contained in the ink jet ink immediately after manufacturing. As the rate of change in particle diameter of the dispersoid is lower, the dispersion stability of the dispersoid is regarded as superior. In addition, in this specification, unless otherwise particularly described, the average particle diameter indicates a volume average particle diameter. In addition, the average particle diameter was measured using a Miroctrac UPA (manufactured by Nikkiso Co., Ltd.).

A: Rate of change in average particle diameter of dispersoid from that immediately after manufacturing is less than 15%.

B: Rate of change in average particle diameter of dispersoid from that immediately after manufacturing is 15% to less than 30%.

C: Rate of change in average particle diameter of dispersoid from that immediately after manufacturing is 30% or more.

D: particle diameter of dispersoid cannot be measured since aggregation and/or gelation occurs.

The evaluation results described above are collectively shown in Table 5.

TABLE 5

| | | EXAMPLE | | | | | | COMPARATIVE EXAMPLE | | |
|---|---|---|---|---|---|---|---|---|---|---|
| | | C1 | C2 | C3 | C4 | C5 | C6 | C1 | C2 | C3 |
| EVALUATION OF DRYING RESISTANCE | | A | A | A | A | A | B | D | C | C |
| EVALUATION OF STORAGE STABILITY | STABILITY OF VISCOSITY | A | A | A | A | A | A | D | C | D |
| | STABILITY OF PARTICLE DIAMETER | A | A | B | B | A | B | D | C | D |

As apparent from Table 5, according to the present disclosure, the drying resistance and the storage stability both have excellent results. On the other hand, according to Comparative Examples, the drying resistance and the storage stability cannot be simultaneously obtained, and satisfactory results cannot be obtained.

In particular, in Comparative Example C1, since insufficient dissolution of the polyester in the dispersant-containing liquid is recognized, it is believed that the amount of the polyester to be adsorbed to the colorant is insufficient in the dispersion preparation, and the dispersion stability of the dispersoid cannot be sufficiently obtained. In addition, since the sulfo group is only present in the polyester as the water-soluble group, it is believed that the affinity to the additives is insufficient, the dispersion state of the colorant is liable to be broken, and the drying resistance and the storage stability are degraded.

In addition, in Comparative Example C2, although the polyester of Synthetic Example 6 is contained as is the case of Example C6, the log P of the polyol is 2.1 and is not in a range of −2.0 to 0.0. Accordingly, since the lipophilic property of the polyol is excessively high, and the solvent adsorbed to the colorant cannot be sufficiently replaced with the polyester, the colorant cannot be sufficiently dispersed, and hence, it is believed that compared to Example C6, the drying resistance and the storage stability are both seriously degraded.

In addition, in Comparative Example C3, although the polyester of Synthetic Example 6 is contained as is the case of Example C6, the log P of the polyol is −2.3 and is not in a range of −2.0 to 0.0. Accordingly, since the lipophilic property of the polyol is excessively low, and the solvent cannot penetrate between colorant particles in pulverization, the pulverization cannot be sufficiently performed, and the colorant is not sufficiently dispersed. As a result, it is believed that compared to Example C6, the drying resistance and the storage stability are both seriously degraded.

What is claimed is:

1. A dispersant-containing liquid comprising:

a polyester functioning as a dispersant;

water; and a solvent, wherein the polyester has a carboxy group which forms no ester bond and a sulfo group, the solvent includes a polyol having a log P of −2.0 to 0.0, and wherein in the polyester, a total rate of a content of a monomer having the carboxy group which forms no ester bond and a content of a monomer having the sulfo group with respect to all monomers forming the polyester is 4.0% or more and 20.0% or less on a molar basis.

2. The dispersant-containing liquid according to claim 1, wherein in the polyester, a rate of a content of the monomer having the carboxy group which forms no ester bond to a content of the monomer having the sulfo group is 50% to 200% on a molar basis.

3. The dispersant-containing liquid according to claim 1, further comprising:

a monovalent inorganic base; and an organic amine, wherein the organic amine includes one or more selected from monoethylamine, diethylamine, triethylamine, monomethylamine, dimethylamine, trimethylamine, diethanolamine, triethanolamine, diisopropanolamine triisopropanolamine, butyldiethanolamine, ethyldiethanolamine, and 2-amino-2-ethyl-1,3-propanediol.

4. The dispersant-containing liquid according to claim 3, wherein the organic amine is hydroxylamine.

5. The dispersant-containing liquid according to claim 1, wherein a content of the polyol with respect to 100.0 parts by mass of the polyester is 1.0 to 50.0 parts by mass.

6. A dispersion comprising:

a polyester functioning as a dispersant;

water;

a dispersoid; and a solvent, wherein the polyester has a carboxy group which forms no ester bond and a sulfo group, the solvent includes a polyol having a log P of −2.0 to 0.0, and wherein in the polyester, a total rate of a content of a monomer having the carboxy group which forms no ester bond and a content of a monomer having the sulfo group with respect to all monomers forming the polyester is 4.0% or more and 20.0% or less on a molar basis.

7. The dispersion according to claim 6, wherein the dispersoid is a disperse dye or an oil-soluble dye.

8. The dispersion according to claim 6, wherein the dispersion is an ink jet composition.

* * * * *